United States Patent [19]

Nakayama et al.

[11] Patent Number: 5,018,064
[45] Date of Patent: May 21, 1991

[54] VIRTUAL COMPUTER SYSTEM

[75] Inventors: Shinji Nakayama; Masaya Watanabe; Shuichi Abe, all of Hadano, Japan

[73] Assignee: Hitachi, Ltd., Tokyo, Japan

[21] Appl. No.: 215,789

[22] Filed: Jul. 6, 1988

[30] Foreign Application Priority Data

Jul. 8, 1987 [JP] Japan .................. 62-168636

[51] Int. Cl.$^5$ ............ G06F 12/00; G06F 12/08
[52] U.S. Cl. .................. 364/200; 364/232.1; 364/256.3; 364/255.1
[58] Field of Search .................. 364/200, 900

[56] References Cited

U.S. PATENT DOCUMENTS

| 4,456,954 | 6/1984 | Bullions, III et al. | 364/200 |
| 4,674,038 | 6/1987 | Brelsford et al. | 364/200 |
| 4,779,188 | 10/1988 | Gum et al. | 364/200 |
| 4,816,991 | 3/1989 | Watanabe et al. | 364/200 |
| 4,843,541 | 6/1989 | Bean et al. | 364/200 |

Primary Examiner—Eddie P. Chan
Attorney, Agent, or Firm—Antonelli, Terry, Stout & Kraus

[57] ABSTRACT

In the conventional virtual computer system, in order to provide the same access method for the host and the guest, there exists a great overhead for the operations to save and to restore the host resource at a change-over between the host and the guest. In the of the invention system, the same access method is provided for the host and the guest and at the same time the overhead is removed. The host resource and the guest resource are separately allocated. There is disposed a mode line indicating whether the present state is associated with the host or the guest. There is also disposed an access controller which operates such that when the mode line indicates the host, the host resource is accessed, and when the guest is indicated, the guest resource is accessed.

4 Claims, 3 Drawing Sheets

VIRTUAL COMPUTER SYSTEM

BACKGROUND OF THE INVENTION

The present invention relates to a virtual computer, and in particular, to a virtual computer system effecting hardware resource control to process a change-over operation between a host and a guest.

In a virtual computer, there are defined a host resource and a guest resource in the architecture thereof. In general, these resources are implemented in the duplicated configuration. In order to share control of instruction execution (for example, of a microprogram) between the host and the guest, it is necessary for the host and guest to access these duplicated resources according to the same access method. For example, in a virtual computer system in which a control register (CR) is stored at address A of a local storage, when the address A is specified, it is necessary that a CR for the host be read in the host mode and that a CR for the guest be read in the guest mode.

In the conventional virtual computer, in order to provide the same access method for the host and guest to access the duplicated resources, at a change-over from the host to the guest, the host resource is moved from an area (to be referred to as an access area) to be accessed from a microprogram to a save area and then the guest resource is set to the access area, whereas at a change-over from the guest to the host, the host resource is restored from the save area to the access area.

Incidentally, a virtual computer of this kind has been described in U.S. Pat. No. 4456954.

According to the prior art, as described above, in order to provide the same access method for the host and the guest to access the duplicated resources, there exists a problem that a considerable overhead is required for the operations to save and to restore the host resource at the change-over processing between the host and guest.

SUMMARY OF THE INVENTION

It is therefore an object of the present invention to provide the same access method for the host and the guest and to provide a virtual computer system which does not require a large amount of overhead to effect the change-over between the host and the guest at a high speed.

The objects above can be achieved by separately disposing a resource for the host and a resource for the guest, a mode line indicating the host or the guest, and an access control section which accesses the resource for the host when the mode line indicates the host and which accesses the resource for the guest when the mode line indicates the guest.

According to the present invention, at a change-over from the host to the guest, a guest resource need only be set the resource and thereafter the mode line is set to indicate the guest mode. In consequence, the operation to save the host resource is not required and hence the change-over can be conducted at a high speed. In addition, at the change-over from the guest to the host, it is only necessary to set the mode line to the host and the host environment can be consequently restored at a high speed.

BRIEF DESCRIPTION OF THE DRAWINGS

The present invention will be apparent from the following detailed description taken in conjunction with the accompanying drawings in which.

DESCRIPTION OF THE PREFERRED EMBODIMENT

Figure 1:
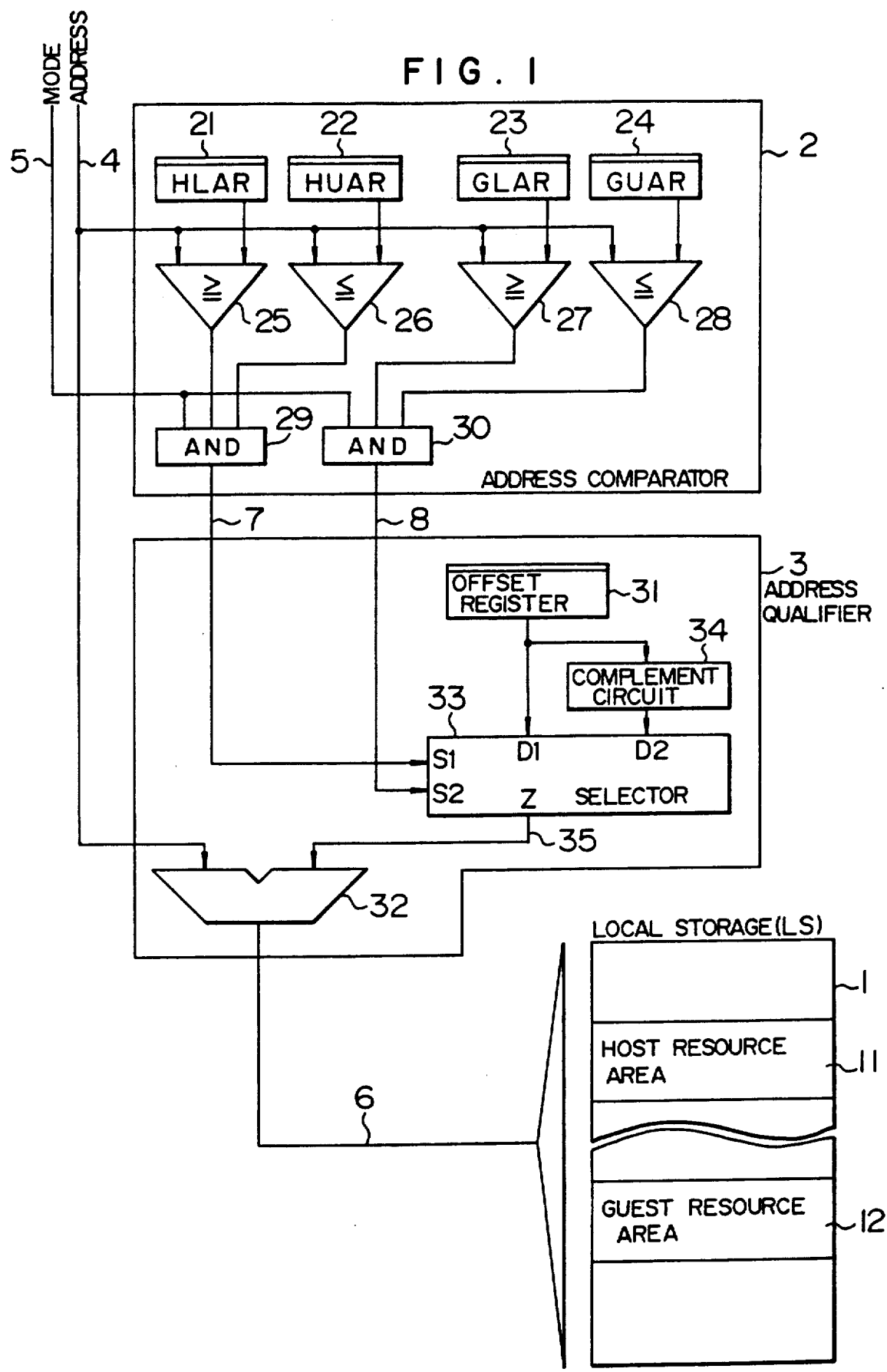
FIG. 1 is a schematic block diagram showing an embodiment according to the present invention.

Referring now to FIG. 1, description will be given of an embodiment according to the present invention. Reference numeral 1 indicates a local storage (LS) in which there are allocated control registers and various work areas. 2 stands for an address compare circuit which effects a comparison to determine whether an LS address is in a range between predetermined upper and lower limits. 3 designates an address qualify circuit for selecting either an address obtained by adding or subtracting a predetermined offset value to or from the LS address or the LS address itself. 11 in the LS 1 indicates a resource area for the host, whereas 12 denotes a resource area for the guest.

The address compare circuit 2 includes a host resource area lower-limit address register (HLAR) 21, a host resource area upper-limit address register (HLAR) 22, a guest resource area lower-limit address register (GLAR) 23, and a guest resource area upper-limit address register (GLAR) 24. The respective upper-limit and lower-limit addresses are set to the host and guest resource areas.

Mode 5 indicates whether the present state is the host state or the guest state and is set to "1" in the guest state. When the mode 5 is "1", an address 4 for the LS 1 is judged by the compare circuits 25 to 28 and AND gates 29 and 30 to determine whether the address 4 is to be used to access the host resource area 11 or the guest resource area 12, and the results are outputted to the respective control lines 7 and 8. An offset register 31 is loaded with an address difference between a host resource area and a guest resource area associated therewith. 34 indicates a complement circuit to output a 2's complement. A selector 33 outputs the value of the offset register 31 when the control line 7 is "1" and delivers the value of the complement circuit 34 when the control line 8 is "1". The output is "0" when both control lines 7 and 8 are "0". An adder 32 adds the address 4 to the output line 35 of the selector 33 so as to produce the qualified LS address 6, which is used as an actual address to the LS 1.

Figure 2A:
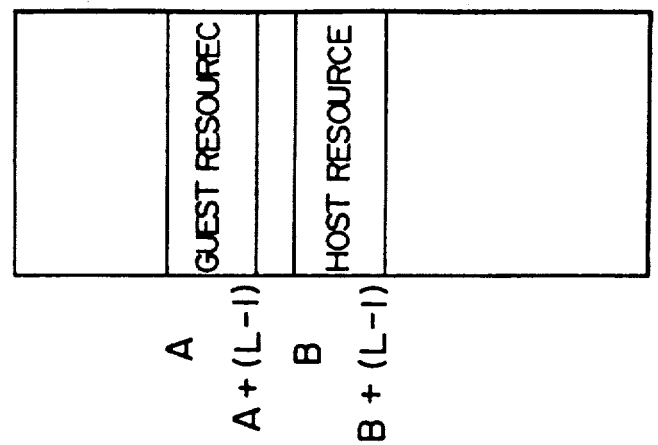
FIGS. 2A-C are is a schematic diagram showing an LS in an embodiment according to the present invention.

Next, the operation of the circuit of FIG. 1 will be described. FIG. 2A shows a physical allocation of the LS 1. That is, the host resource area is allocated to the addresses A to $A+(L-1)$ and the guest resource area is allocated to the addresses B to $B+(L-1)$. In this case, the HLAR 21, HUAR 22, GLAR 23, and GUAR 24 are set to A, $A+(L-1)$, B, and $B+(L-1)$, respectively; whereas the offset register 31 is loaded with $(B-A)$.

In the host mode, namely, when the mode line 5 is "0", both control lines 7 and 8 are set to "0" and hence the selector 33 outputs "0". In consequence, the LS address 4 is directly delivered as the qualified LS address 6 and the LS 1 is accessed by use of the address 6.

Figure 2B:
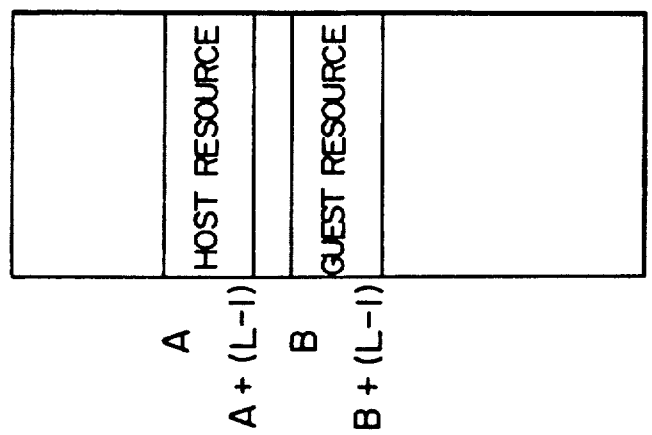

Consequently, the LS schema viewed from the microprogram is as shown in FIG. 2B.

Figure 2C:
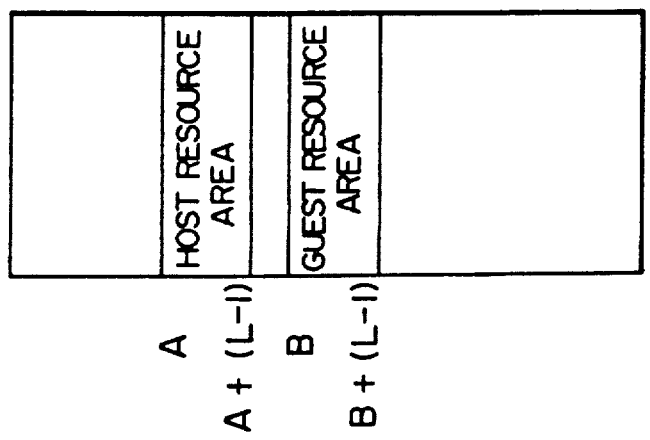

Next, let us consider a case of the guest mode, namely, where the mode line 5 is "1". The control line 7 becomes "1" when the LS address 4 is in the range from A to A+(L−1) and the qualified address 6 is obtained by adding the offset value (B−A) to the LS address 4. In consequence, the guest resource area is accessed. On the other hand, when the LS address 4 is in a range from B to B+(L−1), the control line 8 is set to "1" and hence the qualified address 6 is attained by subtracting the offset value (B−A) from the LS address 4. In consequence, the host resource area is accessed. An access to the other area is effected in the same fashion as for the access in the host mode. The LS schema viewed from the microprogram is as shown in FIG. 2C.

Description has been given of the case where the resources to be saved are implemented in a local storage. This also applies to cases where the resources are implemented by means of registers, latches, and the like.

Next, a flow of processing in a change-over between the host and the guest will be described according to the present invention with reference to an example of operations under the virtual computer architecture of the 370/XA of IBM.

Figure 3:
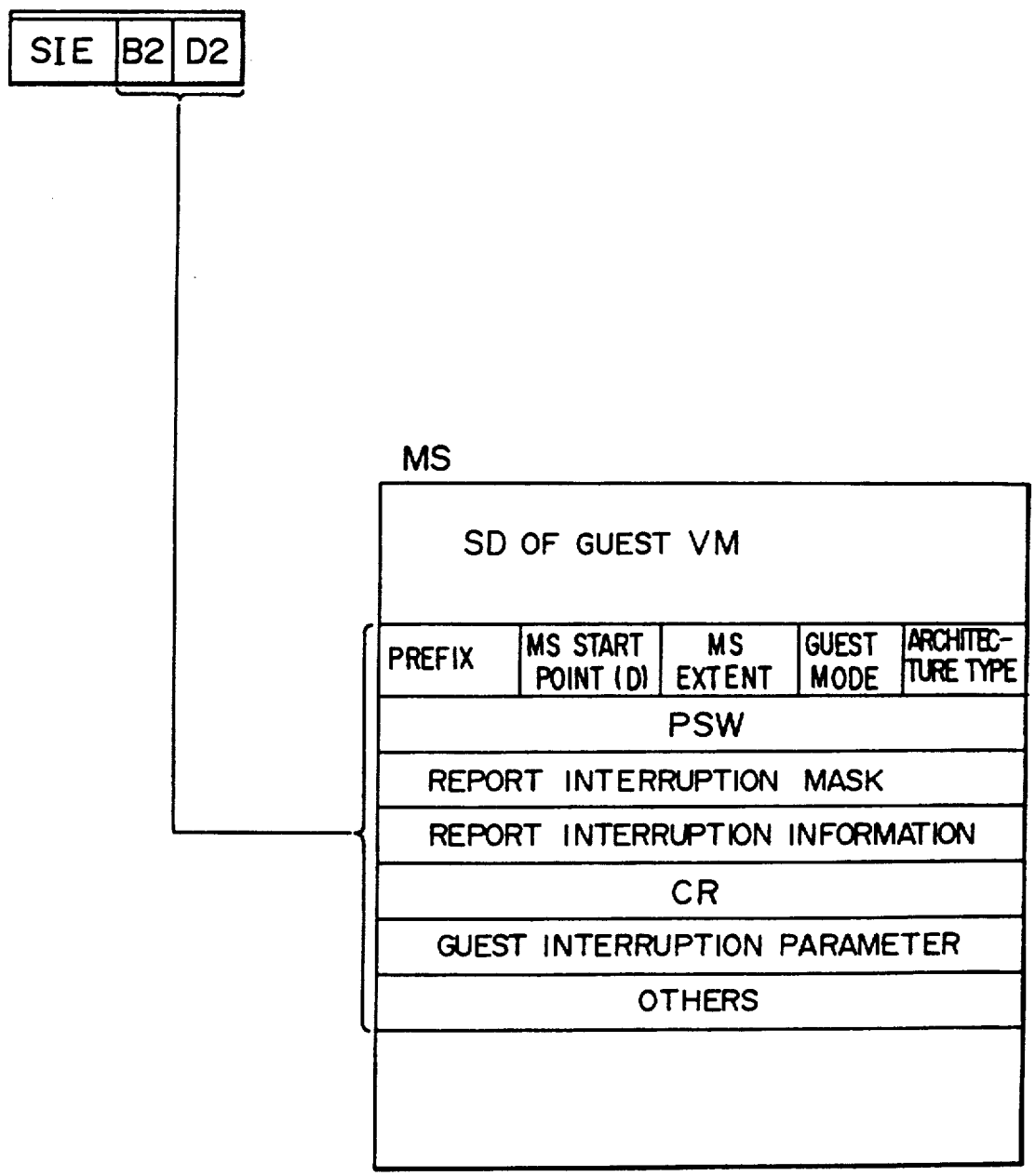
FIG. 3 is a schematic diagram showing an SIE instruction.

In the virtual computer system of the 370/XA architecture of IBM, after a Start Interpretative Execution (SIE) instruction is executed in a host control program, the operation of a virtual machine (VM) is initiated. FIG. 3 shows the instruction format of the SIE instruction. For the SIE instruction, a state descriptor (SD) positioned according to the B2 and D2 fields thereof is specified as an operand. An instruction execute section of the central processing unit (CPU) sets the respective fields of the SD from the main storage (MS) as the hardware resources of the CPU and then causes the CPU to operate as a guest VM. The hardware resources established here include a guest mode latch, a program status word (PSW), a control register (CR), a general register (GR), a prefix, and an MS extent register. On the other hand, the state of the host is saved in the CPU. The SD is accordingly used to describe the architecture of the guest VM viewed from the guest instruction.

The guest VM initiated by the SIE instruction emulates a guest program until an interruption event or an interception takes place. The interruption event occurs in a case where processing of the host is required because of, for example, an input/output interruption or an external interruption, whereas the interception occurs, for example, at an execution of an instruction requiring the host processing. In some privileged instructions, a condition whether the interception is to be caused can be specified by use of an interception mask field of the SD.

When an interruption event or an interception takes place, the guest VM terminates the operation and the CPU is set to the host mode, thereby restoring the state where the SIE instruction is executed.

In order to save the state of the host and to establish the environment of the guest in the SIE instruction, the host resource is conventionally saved from the access area to the save area so as to load the access area with the guest resource defined by the SD. On the other hand, according to the present invention, the guest resource read from the SD is set to the guest resource area and the guest mode is set to the on state, thereby completing the change-over of the state. As compared with the conventional example, the operation to save the host resource, for example, the operation to move the data from the LS is not required and hence the processing speed can be increased.

After the operations above, the execution of the guest is started. During the execution of the guest, for example, the LS address employed when a control register in the LS 1 is accessed from the microprogram is, like in the case of the operation in the host state, A+x (0≦x≦(L−1); however, the address is qualified by the qualify circuit 3 so as to access a control register for the guest at an address B+x. In consequence, there is provided the common access method for the microprogram with respect to the host and the guest when accessing the control register in the LS 1.

When the execution of the guest VM is terminated with the host interruption or the interception, the guest resource in execution is stored in a predetermined SD area in the MS, the CPU is restored to the host state at the execution of the SIE instruction, and the guest mode is turned off. Conventionally, for the LS, in order to restore the host state, the host resource is transferred from the host save area to the access area. According to the present invention, the transfer of the data above is not necessary and hence the processing speed can be increased.

Through the procedures above, there is provided the same access method for the host and the guest to access the duplicated resources so as to achieve a high-speed change-over operation.

According to the present invention, the operations to save and to restore the host state at the change-over between the host and the guest can be effected only by changing the value on the mode line and by setting the value for the guest resource, which in consequence leads to an effect that the overhead due to the change-over is greatly reduced.

We claim:

1. A virtual computer system for initiating a guest computer by setting a state descriptor of the guest computer in a hardware resource area, the state descriptor being stored in a main storage and its address being indicated by a start interpretative execution (SIE) instruction, wherein the system comprises:

a local memory having a plurality of storage elements assigned to respective consecutively ordered addresses, wherein said plurality of storage elements include a plurality of first storage elements designated by a first continuous set of addresses, said first storage elements being defined as a hardware resource area for a host computer, and a plurality of second storage elements designated by a second continuous set of addresses, said second storage elements being defined as a hardware resource area for the guest computer, and wherein all or a part of the state descriptor of the guest computer is read out from the main storage and set in the hardware resource area for the guest computer when the SIE instruction is executed;

a mode latch for indicating whether said system is in a host computer mode or a guest computer mode;

means for detecting whether an address requested by the system is included in the first continuous set of addresses of the first storage elements;

means for generating an offset of addresses of the first storage elements and the second storage elements;

an access control unit for modifying the address requested by the system by applying the offset to address requested by the system when the mode latch indicates a guest computer mode and when said detecting means indicates the address requested by the system is included in the hardware resource area for the host computer, whereby the modified address represents an address of the hardware resource area for the guest; and means for providing the local storage with the modified address.

2. A virtual computer system according to claim 1, wherein the system further comprises:

second means for detecting whether an address requested by the system is included in the second continuous set of addresses of the second storage elements; and said access control unit for modifying the address requested by the system by applying the offset to the address requested by the system when the mode latch indicates a guest computer mode and when said second detecting means indicates the address requested by the system is included in the hardware resource area for the guest computer, whereby the modified address represents an address of the hardware resource area for the host computer.

3. A virtual computer system according to claim 2, wherein said hardware resource area for the host computer and the hardware resource area for the guest computer are composed of control registers.

4. A virtual computer system according to claim 1, wherein said hardware resource area for the host computer and said hardware resource area for the guest computer are accessed from a microprogram.

* * * * *